United States Patent [19]
Fakai

[11] 3,803,412
[45] Apr. 9, 1974

[54] IMAGE DISPLAY AND RECORDING DEVICE
[75] Inventor: Yuh Fakai, Kamukura, Japan
[73] Assignee: Fuji Photo Film Co. Ltd., Nakanuma Minami Ashigara-shi, Kanagawa, Japan
[22] Filed: Jan. 31, 1973
[21] Appl. No.: 328,163

[30] Foreign Application Priority Data
Jan. 31, 1972  Japan.............................. 47/11128

[52] U.S. Cl.............................. 250/316, 250/319
[51] Int. Cl............................................. B41m 5/00
[58] Field of Search........... 313/96, 101; 250/213 R; 250/316

Primary Examiner—James W. Lawrence
Assistant Examiner—B. C. Anderson
Attorney, Agent, or Firm—Sughrue, Rothwell, Mion, Zinn & Macpeak

[57] ABSTRACT

An image displaying and recording device comprises; a photosensitive layer including two dimensionally arranged photoelectric conversion elements; opaque insulating materials provided between the elements to insulate the elements from each other; and an image displaying and recording layer including a number of cavities arranged in alignment with the conversion elements, in which a number of fine dielectric foil or needle shaped pieces are contained, and means for providing an electric field to the cavities corresponding to the field induced in the elements by input light. A light image input to the photosensitive layer is displayed and recorded on the image displaying and recording layer.

14 Claims, 5 Drawing Figures

PATENTED APR 9 1974　　　　　　　　　　　　　　　　　　3,803,412

3,803,412

IMAGE DISPLAY AND RECORDING DEVICE

BACKGROUND OF THE INVENTION

1. Field of the Invention

This invention relates to a device for displaying and recording images utilizing dielectric foil pieces and/or needle-shaped pieces, more particularly to a device for displaying and recording an image on a two-dimensional arrangement of a number of photo-electric conversion elements combined with cavities containing dielectric pieces which change in orientation when an electric field is applied thereto.

2. Description of the Prior Art

There are two types of image display systems in general use. One is a system wherein electric lamps or light emitting diodes are turned on and off according to an electric signal applied thereto or a cathode ray tube is used for converting electric signals to visual signals. The other is an image intensifier system wherein an optical image or radiation image input is displayed. In the former type of image display system a scanning technique is necessary in order to obtain images from the electric signal input. In the latter type of image display system, scanning is not necessary.

This invention belongs to the latter type of system and the input is an optical image.

A conventional image intensifier tube wherein an optical image or radiation image input is projected on an image plane comprising an input fluorescent layer and a photoelectric layer from which photoelectrons are guided to a fluorescent screen through electronic lenses for visualization necessitates a vacuum container for retaining the electronic lenses which occupy a fairly large space. Further, in a conventional image intensifier system as described above it is difficult to obtain a large image display.

SUMMARY OF THE INVENTION

In light of the above-described defects of a conventional image intensifier system, the primary object of the present invention is to provide a novel device for displaying and recording an image without using a photochemical process in which a scanning operation is not necessary and which does not require a large space.

Still another object of the present invention is to provide a device for displaying and recording an image in which a recorded image can be observed immediately after the recording operation.

A further object of the present invention is to provide a device for displaying and recording an image in which an infra-red or X-ray image can be visualized.

The above objects of the present invention are accomplished by providing cavities containing dielectric foil pieces and/or needle-shaped pieces on the back of photo-electric conversion elements provided in a two-dimensional arrangement so that the orientation of the pieces can be changed by an electric field applied on the cavities by the photoelectric conversion elements.

It is well known that the orientation of a dielectric foil piece and/or needle-shaped piece is parallel to the direction of an electric field when an electric field is applied thereon. Therefore, if the dielectric pieces are scattered on an electrode of a photocell, the degree of change in the orientation thereof depends upon the intensity of light irradiated thereon. If the electrode is made of a white material and the dielectric pieces are made of a black material, for example, the change in the orientation of the pieces can be visually observed.

The change in the orientation of the pieces remains even after the light is removed from the photocell, and accordingly, the visualized intensity of the electric field, that is the intensity or brightness of the light, is temporarily recorded.

If the photocells are arranged in a two-dimensional order, an optical image or a radiation image projected thereon is visualized as an image according to the above-described phenomenon. The visualized image remains for a while and can be recorded permanently, if necessary, by fixing the pieces in the cavity. The visualized image can be easily erased by providing an erasing electric field in a direction perpendicular to the direction of the recording field. The image indicating process is thus a reversible process.

Other objects, features and advantages of the present invention will be more explicit from the following description of the preferred embodiments thereof taken in conjunction with the accompanying drawings.

PREFERRED EMBODIMENTS OF THE INVENTION

Figure 1:
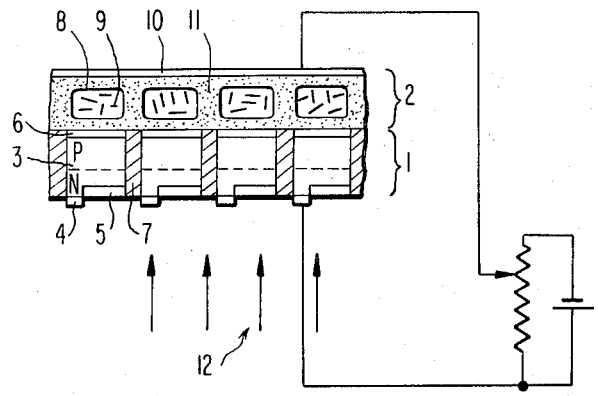
FIG. 1 is a sectional view showing the basic construction of the image indicating and recording device in accordance with the present invention.

Referring to FIG. 1, fine elements of photovaltaic silicon PN junction elements (e.g., Silicon Blue Cell SBC made by Sharp K.K. of Japan) are arranged in a two dimensional arrangement as the photoelectric conversion elements. A photosensitive layer 1 comprises the two dimensional arrangement of the silicon photosensitive elements 3 which are insulated from each other by opaque insulating material 7. The silicon photosensitive elements 3 are of the PN junction type and are covered with a negative electrode 4 and a silicon dioxide film 5 on the front surface thereof and provided at the back surface thereof with a positive electrode 6. The silicon photosensitive element generates a photo-electromotive force between the positive and negative electrodes when it is exposed to light 12, the voltage of which depends upon the intensity of the light. For example, in case of a silicon blue cell SBC illuminated by 1 lux light, about 50mV of voltage released. A display layer 2 is attached to the photosensitive layer 1. The display layer 2 comprises a number of two dimensionally arranged small cavities 8 formed in a plastic film layer 11 and a transparent electrode layer 10 covered thereon. A number of colored dielectric foil pieces 9 are contained within the small cavities 8 and are made freely movable therein. Since the dielectric foil pieces are liable to be charged electrostatically by friction charging or the like and apt to stick on the internal wall surface of the cavities, the pieces are preferably coated with the same material as the plastic film 11. In order to provide an electric field to the cavities, the negative electrodes 4 of the photosensitive layer 1 are electrically connected with the transparent electrode 10 of the display layer 2.

Figure 2:
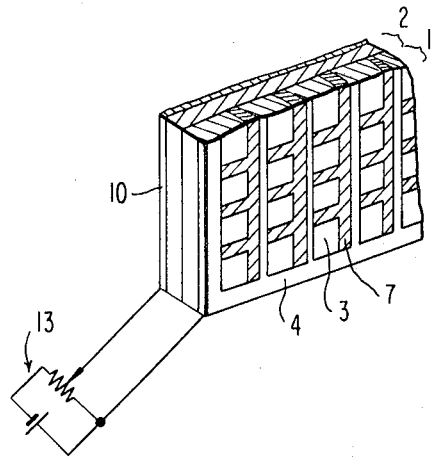
FIG. 2 is a partial perspective view showing the two-dimensional arrangement of the photo-electric elements and cavities constituting the main portion of a device in accordance with the present invention.

FIG. 2 shows the above construction in more display detail in which the silicon photosensitive elements 3 constituting the photosensitive layer 1 are arranged in a mosaic pattern. Each element 3 is insulated from other elements by means of opaque insulating material 7. The negative electrodes 4 are connected with each other through a vaporized film coating on the photosensitive layer 1 and connected with the transparent electrode 10 on the display layer 2 through a wiring circuit 13.

In operation, when light impinges on the silicon elements 3, a photo-electromotive force is generated between the negative electrodes 4 and the positive electrodes 6 within the elements 3 according to the intensity of the light. Since the electrodes 4 are electrically connected with the transparent electrode 10, the cavities are consequently impressed with the photo-electromotive force induced between the negative electrodes 4 and the positive electrodes 6.

By providing a bias voltage between the electrodes 4 and the transparent electrode 10 by means of the circuit 13, it becomes possible to change the working level of the response of the display means involving the dielectric elements hereinbelow referred to. When ambient conditions are bright, e.g., on a clear, sunny day by interposing a bias voltage between electrode 4 and transparent electrode 10 to overcome the voltage generated by the brightness, i.e., it is possible to generate a response only to the light with a level stronger than that of the ambient brightness. In addition, the bias voltage can be changed, if desired, by appropriate circuitry included in the line connecting electrode 4 and transparent electrode 10.

By the impression of the photo-electromotive force that is an electric field on the cavities, the dielectric foil pieces 9 within the cavities are oriented in a direction parallel to the direction of the electric field. Since the respective silicon photosensitive elements 3 are insulated from each other and accordingly independent of each other, the rate of orientation of the dielectric pieces 9 is independently determined for each cavity. If the dielectric foil pieces 9 are colored, the cavities which receive the light are lowered in visual density. That is to say, a positive image can be indicated by the two dimensional arrangement of the indicating cavitied on the display layer 2 in response to the impinging of a light image projected onto the photosensitive layer 1. For instance, when the distance between the electrodes of the indicating layer is 100 $\mu$, a 50mV of photo-electromotive force is obtained in the case of a 1 lux light input, and accordingly the electric field provided on the cavities is 5 Volt/cm.

As will be apparent to one skilled in the art, the force applied to the dielectric elements will depend, inter alia, on the shape of the dielectric element.

The dielectric elements of the present invention are preferably in the shape of a foil or in a shape of a needle, that is, of a shape so that upon a change in the orientation thereof upon the application of a photo-input in accordance with the present invention they vary from an orientation which presents low visual density to an orientation which presents high visual density, or vice-versa. Thus, although the dielectric elements of the present invention are preferably described as foil shaped and needly shaped in two embodiments, it will be clear that the present invention includes equivalent shapes which permit the sharp visual distinction with change in orientation described above.

While the exact dimensions of the elements can vary greatly, depending upon the contemplated use, for example strength of the electric field generated, etc, for certain easily fabricated systems, which can be constructed at low cost and provide excellent results, certain perferred embodiments do exist.

In the foil embodiment of the present invention, where the foil can be viewed as an extremely small, thin sheet paper which can be square, rectangular or other polygonal shape, it is desirable that the ratio of the length in the longitudinal direction thereof to the thickness thereof desirably be on the order of 50 – 100, and in the needle shaped embodiment it is preferred that the ratio of the length to diameter be on the order of greater than 100. In both instances, the larger the ratio becomes the higher the sensitivity to light becomes, and correspondingly, the smaller the ratio becomes the lower the sensitivity to light becomes.

Considering ease of fabrication and visual response of the eye, thin foils desirably have length of at least several 10 microns, and the needle shaped dielectrics have a length of at least several 10 microns. In this case, the thickness of the thin foil will generally be about 1 micron to about 0.1 micron, and the diameter of the needle shaped material will also be in the order of about 1 micron to about 0.1 micron.

While examples of numerous dielectric materials as may be used in the present invention are set out above, it can generally be said that it is preferred to use ferro-electric materials having as low a specific gravity as possible and as high a dielectric constant as possible.

As dielectric materials, a ferro-electric material with a high dielectric const. at ambient temperature can be used.

A large number of such dielectric materials are available, and the present invention is not limited to any special dielectric material. However, considering cost and results, several preferred materials do exist, and one such material is ferroelectric SbSI.(No. 41) Needle shaped crystals of SbSI are easily obtained in a manner known to the art ferroelectric SbSI has a dielectric constant ($\epsilon$) of 50,000 at 20° C.

Illustrative of the many other dielectric materials which can be used are materials based on barium titanate, for example, barium titanate containing 30 percent barium siliconate (Curie point $Tc$= −30° C, $\epsilon$=1,500 at 20° C), barium titanate containing 20 percent barium stannate (Curie point $Tc$=−35° c, $\epsilon$=1,800 at 20° C) and barium titanate containing 40 percent strontium titanate.

Further illustrative of the dielectric materials, which can be used is PTF ($PbTa_{1/2}Fe_{1/2}O_3$), which has a dielectric constant $\epsilon$=3,000 at 20° C and a Curie point $Tc$= −30° C.

Numerous other useful ferroelectric materials will be apparent to one skilled in the art.

It will be understood that a negative image can be obtained if the dielectric pieces are made of a white material and the internal surface of the cavities is black or dark in color.

Of course, it will be apparent to one skilled in the art that two or more contrasting colors can be used to form the dielectric pieces and further that any contrasting color combination or combinations can be used between the dielectric pieces and the internal surface of the cavities. For instance, in some embodiments by the selective application of an electromotive force it might be desirable to obtain a multicolor image display.

Figure 3:
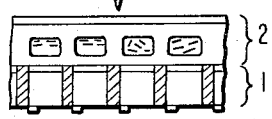
FIG. 3 is a partial cross-sectional view of a device for an explanation of the method of partially erasing the image shown by the use of a local field.

In the case of erasing the displayed image, it is preferred to orient all the pieces in parallel to the surface of the display layer 2. One of the methods to erase the image indicated on the indicating layer 2 is to put the indicating layer in a random electric field. Since the dielectric material is attracted to the place where there is a strong field, the image is erased. FIG. 3 shows one example of this type of erasing method.

In FIG. 3, an erasing electrode 14 impressed with a high voltage is scanned along the surface of the image indicating layer 2 to provide a random field thereon. The dielectric pieces 9 are attracted upward to the field and accordingly the image is erased. The high voltage impressed on the erasing electrode can be an alternating current voltage.

Figure 4:
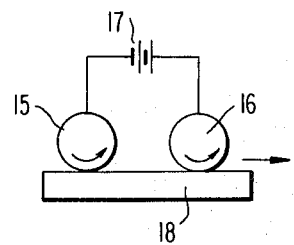
FIG. 4 is a side view showing a method of erasing an image on a device of the invention.

Another method of erasing the image indicated on the display layer is to utilize an electric field to orient the pieces in parallel to the surface of the display layer. This can easily be carried out by providing an electric field on the surface of the display layer in a direction parallel to the surface thereof. FIG. 4 shows one example of this type of erasing method. Referring to FIG. 4, a pair of rollers 15 and 16 are impressed with opposite polarities by an electric source 17 and rolled on the surface of the display layer 18. In this case, however, the transparent electrode 10 should be removed when the image is erased because the parallel field cannot be effectively impressed on the cavities if the transparent electrode 10 is extending between the rollers 15 and 16 and the cavities 8. This method is therefore not suitable for erasing an image once displayed on the display layer 2. This method can, however, be very useful when employed in the process of manufacture of the image indicating device in accordance with the present invention. In manufacturing the device, the transparent layer 10 is preferred to be attached to the display layer after the dielectric pieces are oriented parallel to the surface thereof by the above method.

Figure 5:
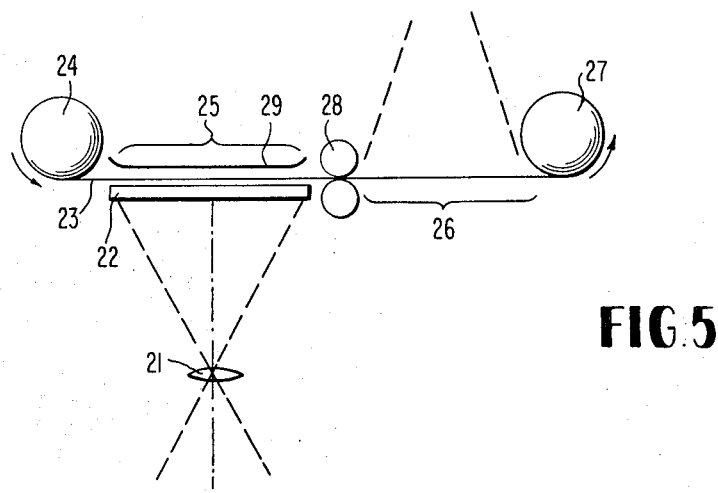
FIG. 5 is a side view showing an application of the present invention to a camera.

Another embodiment of the invention will now be described in detail. It is possible to provide a unique method of photography by first independently preparing a photosensitive layer and a display layer and then at the time of exposure contacting one with the other. In FIG. 5, an example thereof is shown.

In FIG. 5 photosensitive plate 22 has the same structure as the photosensitive layer of the display and recording device described above, and the recording film 23 has the same structure as that of the display layer thereof and is a thermoplastic film having a plurality of minute hollows including the dielectric pieces.

To record an image, a light pattern is focused on the photosensitive plate 22 via exposure lens 21. At the same time as this exposure that recording film 23 is between photosensitive plate 22 and the back electrode plate 29, closely contacting each element. These operations are performed in recording section 25.

Also shown in FIG. 5 are a film feeding roll 24, a film take up roll 27, a display section 26 and heating and pressure rolls 28.

The plane electrode 29 is an electrode serving the same function as transparent electrode 10 attached to said display layer 2. It is provided separately from the film 23 here. The transparent plane electrode 29, however, may be attached integrally to the film 23 if it is made flexible. It will be understood, however, that the transparent electrode is preferred to be provided separately from the film 23 from the viewpoint of economy. At the time of exposure, the light image is projected onto the photosensitive layer 22 which is in contact with the image recording film 23 which is in turn interposed between the transparent electrode 29 and the photosensitive layer 22. Then, just as described in the foregoing embodiment, the dielectric foil pieces in the fine cavities in the film 23 are oriented according to the electric field generated by the light input, whereby a positive image is obtained in the film 23. In order to render the image permanently fixed, the film 23 can be heated or pressed to fix the pieces in their orientation. The roller 28 is provided for the purpose of fixing the image. The indicating section 26 is provided for observing the image recorded where the image can be observed by the eyes or enlarged and projected on a screen through a projection lens system for display. This embodiment of the invention is very advantageous in the economical sense since the photosensitive layer can be repeatedly used and accordingly it is only the plastic film that is consumed. Further, it is a great advantage that the recorded image can be observed immediately after the recording step.

The best way of fixing the image is by heating, since heating is most simple and economical. If the plastic film 23 is fused by heating the film up the softening point, the dielectric pieces stick to the internal wall of the cavities as they are oriented. Further, if a heat-shrinkable plastic film is used, the cavities shrink to fix the foil pieces.

As thermoplastic films which can be used the following are favourable: Polyethylene films, preferably with a softening temperature of 115° C – 125° C (in the case of HD Polyethylene) or 85° C – 95° C (in the case of LD Polyethylene), polystyrene films, preferably of a softening temperature on the order of 100° C, polyvinyl chloride, preferably of a softening temperature on the order of 90° C and polyvinylidene chloride preferably of a softening temperature on the order of 60° C – 100° C.

As heat shrinkable plastic films, the above thermoplastic films in elongated form are preferably used.

As methods of producing a plurality of minute hollow in the thermoplastic films or the heat shrinkable plastic films, one can mechanically form recesses of the desired mosaic shape and then insert the dielectric materials therein. If desired, one can adhere foamable materials to the dielectric materials, insert them into a thermoplastic material simultaneously form the plastic film and generate foams by heating.

It will be understood that the photoelectric conversion elements need not be photovoltaic silicon elements, but can be any kind of material so long as the material generates an electric field when illuminated.

For example, the method of displaying and recording the image may be any one of method for obtaining the electric field corresponding to an input photo-image formed by a photoconductive layer and an electric source externally supplied.

By using materials having different spectral sensitivity from that of silicon, it is possible to record images of radiation having various wavelengths. For instance, it is possible to visualize an X-ray image by the use of CdS or CdSe, which is very useful in the medical field industrial fields. Further, if silicon sensitive to infra-red rays is used, an infra-red ray image can be visualized.

While the invention has been described in detail and with reference to specific embodiments thereof, it will be apparent to one skilled in the art that various changes and modifications can be made therein without departing from the spirit and scope thereof.

What is claimed is:

1. A device for displaying and recording images comprising: a photosensitive layer means including two-dimensionally arranged photoelectric conversion elements which generate a voltage dependent upon the intensity of light impinging thereon, and insulating material provided between said elements for insulating said elements from each other; an image displaying and recording layer including a number of cavities arranged in alignment with said elements respectively, said cavities containing a number of fine dielectric pieces; and electrode means connected to said elements for applying to each cavity an electric field corresponding to the voltage generated in the element aligned with said each cavity, so that the dielectric pieces are oriented in the direction corresponding to said applied electric field to make a visible image.

2. A device for displaying and recording images as defined in claim 1 wherein said insulating material is opaque.

3. A device for displaying and recording images as defined in claim 1 wherein said photoelectric conversion element is silicon PN junction device.

4. A device for displaying and recording images as defined in claim 3 wherein said silicon is sensitive to visible light.

5. A device for displaying and recording image as defined in claim 3 wherein said silicon is sensitive to infra-red rays.

6. A device for displaying and recording images as defined in claim 1 wherein said photoelectric conversion elements are photoconductive elements.

7. A device for displaying and recording image as defined in claim 1 wherein said dielectric pieces are in the form of foil pieces.

8. A device for diplaying and recording images as defined in claim 1 wherein said dielectric pieces are in the form of needle shaped pieces.

9. A device for displaying and recording images as defined in claim 1 wherein said electrode means comprises a positive electrode and a negative electrode provided on opposite sides of each of said conversion elements, and a transparent electrode provided on the surface of said image indicating and recording layer and which is electrically connected with said negative electrode.

10. A device for displaying and recording images as defined in claim 9 wherein said transparent electrode is attached to the surface of the image displaying and recording layer.

11. A device for displaying and recording images as defined in claim 9 wherein said transparent electrode is separated from the image displaying and recording layer and said photosensitive layer is separated from the image displaying and recording layer.

12. A device for displaying and recording images as defined in claim 9 wherein a bias voltage is provided between said transparent electrode and said negative electrode.

13. A device for displaying and recording images as defined in claim 1 wherein said image displaying and recording layer comprises a thermoplastic film enclosing said cavities.

14. A device for displaying and recording images as defined in claim 13 wherein said thermoplastic film is heat shrinkable.

* * * * *